Jan. 23, 1962 N. D. SINTETOS 3,017,913
VEGETABLE TRIMMING APPARATUS
Filed Oct. 22, 1958 2 Sheets-Sheet 1
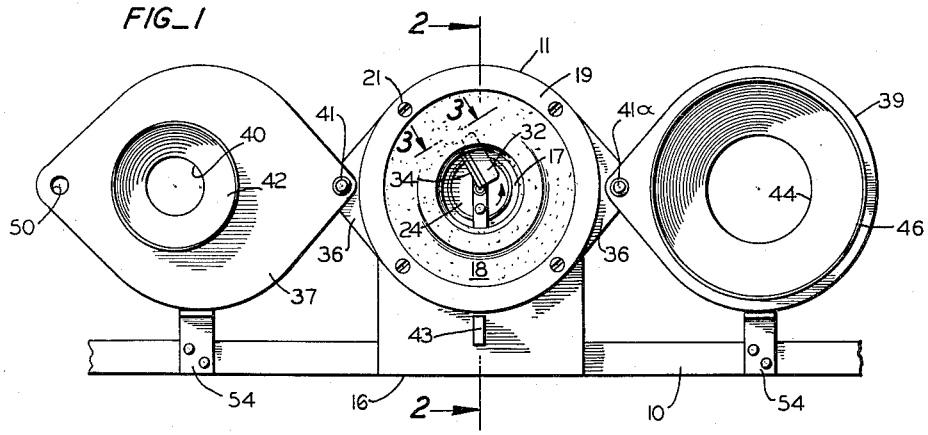
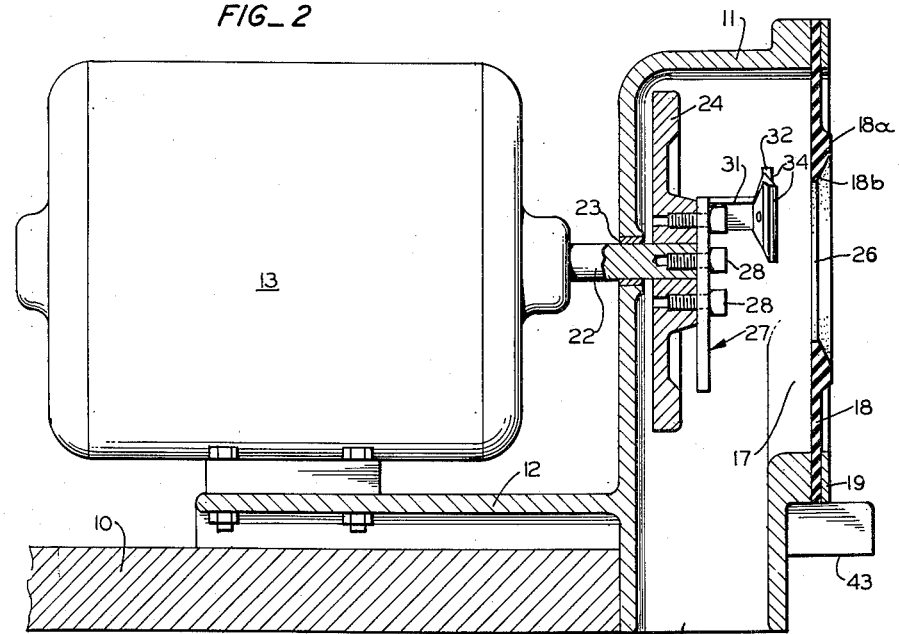
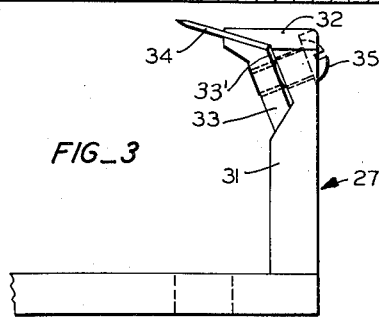
INVENTOR.
NICHOLAS D. SINTETOS
BY
ATTORNEYS

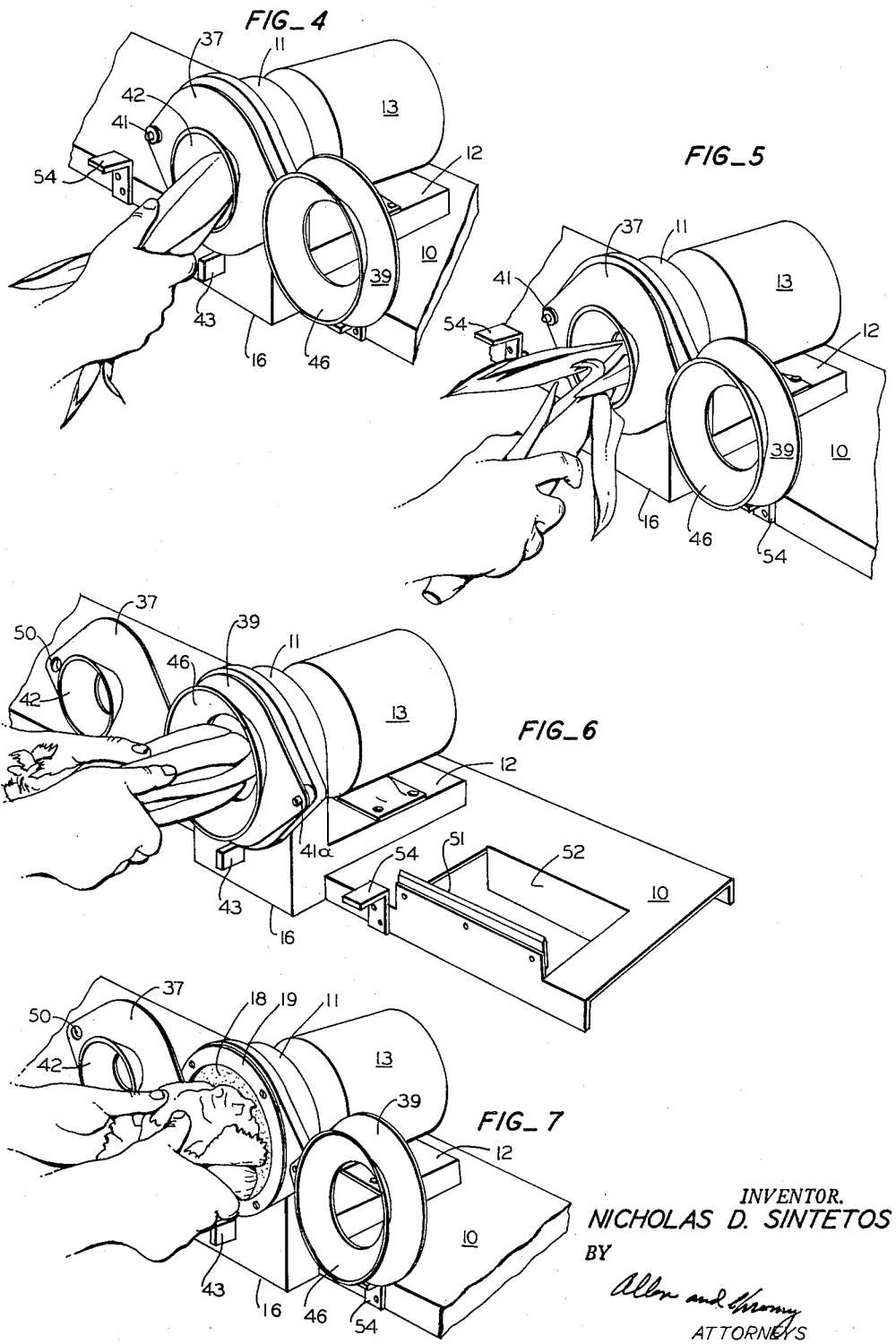

3,017,913
VEGETABLE TRIMMING APPARATUS
Nicholas D. Sintetos, San Bernadino, Calif., assignor, by mesne assignments, of one-half to Genevieve I. Magnuson, and one-half to Genevieve I. Magnuson, Robert Magnuson, and Lois J. Fox, as trustees
Filed Oct. 22, 1958, Ser. No. 768,964
6 Claims. (Cl. 146—81)

The present invention relates to vegetable trimming apparatus of a power driven type adapted to be employed in the vegetable sections of super markets for trimming fresh vegetables such as corn, celery, lettuce and the like, and is concerned more particularly with a vegetable trimming apparatus of the above character in which selectively useable guide and guard means are provided for cooperation with a cutting knife.

It is a general object of the invention to provide an improved vegetable trimming apparatus to provide an attractive appearance in an efficient manner.

Another object of the invention is to provide improved vegetable trimming apparatus which employs a resilient or flexible guard with respect to a rotating knife.

A further object of the invention is to provide vegetable trimming apparatus of the above character in which selectively operable guard means are mounted for movement into and out of operative guarding relation with respect to the knife.

Still another object of the invention is to provide an improved and desirable knife mounting means in vegetable trimming apparatus of the above character.

The above and other objects of the invention are obtained as described in the accompanying description, made with reference to the accompanying drawings, in which:

FIGURE 1 is a front elevational view of the vegetable trimming apparatus;

FIGURE 2 is a vertical sectional enlarged view, partially in elevation, taken in a plane indicated by the line 2—2 in FIGURE 1;

FIGURE 3 is an enlarged view of the knife and its mounting means;

FIGURE 4 is a schematic perspective view of the apparatus as used in trimming the butt end of corn.

FIGURE 5 is a schematic perspective view similar to FIGURE 4 but illustrating the trimming of the blossom end of the corn.

FIGURE 6 is a view similar to FIGURES 4 and 5 illustrating apparatus as used in trimming the butt end of a bunch of celery.

FIGURE 7 is a view similar to FIGURES 4 through 6 but illustrating the apparatus in trimming the butt end of a head of lettuce.

Referring to FIGURES 1 and 2 there is illustrated a supporting frame or table 10 on which a housing 11 is mounted, the housing 11 having a bracket extension 12 on which a motor 13 is suitably secured. The housing 11 is provided with a bottom discharge opening 16, and a side or front feed opening 17 which is partially closed by an annular diaphragm 18 of rubber or other suitable resilient material held in place by a clamping ring 19 and suitable fastening screws 21. The motor 13 has a drive shaft 22 which is journaled in a sleeve bearing 23 in the housing 11 and projects therein carrying a fly wheel 24. The shaft 22 is axially aligned with the central opening 26 in the flexible guard 18 which is defined by thickened annular portion 18a having a tapered or frusto-conical inner guide wall 18b. The shaft 22 also carries a knife mounting structure 27 which is secured to the shaft by a cap screw 28, and to the fly wheel 24 by another cap screw 28. The knife mounting structure 27 is generally L-shaped and includes projecting arm portion 31 disposed in offset relation to the axis of rotation of the shaft 22 and having an inwardly projecting end portion or knife mount 32 which, with knife mounting plate 33, provides a knife mounting slot 33' in which the knife 34 can be clamped by means of a screw 35. The plate 33 is wedge-shaped on one surface and seats in a wedge shaped recess in the knife mount 32. The knife 34 is disposed with its inner corner substantially at the axis of rotation of the shaft 22 and extends outwardly to or beyond the periphery of the circular opening 26 to provide a closed path of rotation or circular cutting path so that the knife edge is capable of cutting throughout this area whatever vegetable portion projects therein.

Selectively operable guard means are mounted for movement to and from active position with respect to the knife.

The casting or housing 11 (FIGURE 1), has a pair of opposite apertured ears 36 in which respective guard and guide members 37 and 39 are pivotally mounted by means of pins or studs 41 and 41a. The guard member 37 has an aperture 40 surrounded by a frusto-conical extension 42, which, in the operative position in front of the resilient guard 18, is co-extensive in part with the larger central opening of the guard 18, being eccentric with respect to the axis of rotation of the shaft 22. The opening 40 extends substantially between the axis of rotation of the shaft 22 and the adjacent edge of the opening 26 so as to place the portion of the corn to be cut at one side of the path of rotation of the knife 34 to provide an effective and intermittent cutting operation. In this position the guard member 37 rests on a stop 43 formed integrally with the housing 11, and the aperture 50 is placed over the mounting stud 41a so as to positively hold the guard and guide member 37 in place. The guard member 37 is of the type adapted for use with a vegetable such as corn, for trimming either end thereof. The guard member 39 is generally similar to the guard member 37 but has a larger central opening 44 surrounded by a larger conical extension 46. This guard member 39 is adapted to be swung in front of the flexible guard 18 in the same manner as described with respect to the guard member 37 for use with larger vegetable bunches such as celery, etc. In the case of the guard member 39 the aperture 44 is preferably concentric with the aperture 26 of the resilient guard member as with leafy vegetables and tender stalks a continuous cutting operation is desirable.

Referring to FIGURES 4 and 5, the guard member 37 is shown in operative position and the operation of trimming the two ends of the corn is illustrated. The operation consists of cutting off small slices of the corn to the desired place, including portions of the cob at the blossom end of the corn. The waste is discharged through the bottom opening 16. FIGURE 6 illustrates the apparatus as used with celery, trimming the butt end of the celery with the guard member 39 in place, and in this use the stationary knife edge 51 is provided adjacent an opening 52 in the table so that the blossom ends of the stalks can be severed if desired by a sharp blow across the knife edge 51 for discharge into a suitable container in the same manner as the smaller pieces fall through the bottom opening 16 of the housing. In the inactive position of either guard member 37 or 39 it rests on a suitable stop 54 carried by the table 10.

FIGURE 7 illustrates the apparatus in use employing the flexible guard in trimming the butt end of a head of lettuce, and this flexible guard can also be used with other vegetables, for example, for trimming the butt end of celery.

While I have shown and described a preferred form of the invention, it will be apparent that the invention is

I claim:

1. In a vegetable trimming apparatus, a housing having a discharge opening and a feed opening, a shaft journaled in said housing at a location opposite to said feed opening and having an axis of rotation, drive means for said shaft, a fly wheel on said shaft within said housing, an L-shaped knife mount carried by said fly wheel including a projecting arm portion offset from said axis of rotation and having knife mounting means at the outer end of said arm portion, said mounting means providing a knife receiving slot, a knife in said slot extending generally radially outwardly from said axis to provide a circular cutting path upon rotation thereof, the plane of said knife being angled slightly to a plane perpendicular to said axis of rotation, a resilient apertured diaphragm secured to said housing to partially close said feed opening and provide a yieldable guard means for said knife, the aperture in said diaphragm being symmetrical with said axis and being at least as small in area as said circular cutting path, an apertured recessed guard member pivotally mounted on said apparatus for selective positioning in front of said diaphragm having a cone to guide a vegetable into engagement with the knife and providing a guard to prevent injury to the hands of the operator, and said housing having a stop for said guard member.

2. In a vegetable trimming apparatus, a housing having a discharge opening and a feed opening, a shaft journaled in said housing at a location opposite to said feed opening and having an axis of rotation, drive means for said shaft, a knife driven by said shaft and extending generally radially outwardly from said axis to provide a circular cutting path upon rotation thereof, a resilient apertured diaphragm secured to said housing to partially close said feed opening and provide a yieldable guard means for said knife, the aperture in said diaphragm being symmetrical with said axis and being at least as small in area as said circular cutting path, an apertured recessed guard member pivotally mounted on said apparatus for selective positioning in front of said diaphragm to guide a vegetable into engagement with the knife and providing a guard to prevent injury to the hands of the operator, and said housing having a stop for said guard member.

3. In a vegetable trimming apparatus, a housing having a discharge opening and a feed opening, a shaft journaled in said housing at a location opposite to said feed opening and having an axis of rotation, drive means for said shaft, a fly wheel on said shaft within said housing, an L-shaped knife mount carried by said fly wheel including projecting arm portion offset from said axis of rotation and having knife mounting means at the outer end of said arm portion, said mounting means providing a knife receiving slot, a knife in said slot extending generally radially outwardly from said axis to provide a circular cutting path upon rotation thereof, a resilient apertured diaphragm secured to said housing to partially close said feed opening and provide a yieldable guard means for said knife, the aperture in said diaphragm being symmetrical with said axis and being at least as small in area as said circular cutting path, a pair of apertured recessed guard members pivotally mounted on said apparatus at opposite sides of said diaphragm for selective positioning in front of said diaphragm, each having a cone to guide vegetables into engagement with the knife and providing a guard to prevent injury to the hands of the operator, and said housing having a common stop for said guard members.

4. In a vegetable trimming apparatus, a housing having a discharge opening and a feed opening, a shaft journaled in said housing at a location opposite to said feed opening and having an axis of rotation, drive means for said shaft, a knife driven by said shaft and extending generally radially outwardly from said axis to provide a circular cutting path upon rotation thereof, a resilient apertured diaphragm secured to said housing to partially close said feed opening and provide a yieldable guard means for said knife, the aperture in said diaphragm being symmetrical with said axis and being at least as small in area as said circular cutting path, a pair of apertured recessed guard members pivotally mounted on said apparatus at opposite sides of said diaphragm for selective positioning in front of said diaphragm to guide vegetables into engagement with the knife and providing a guard to prevent injury to the hands of the operator, and said housing having a common stop for said guard members.

5. In a vegetable trimming apparatus, a housing having a feed opening, a knife mounted for rotation about an axis in said housing and adjacent said opening to cut an article inserted therein, an apertured guard member pivotally mounted on said apparatus to pivot about a horizontal axis generally parallel to the rotation axis of said knife for selective positioning in front of said feed opening, said guard member having a frusto-conical shaped funnel portion to guide a vegetable into engagement with the knife and also provide a guard to prevent injury to the hands of the operator, the aperture of said guard member being off-set with respect to said rotation axis to provide intermittent cutting of the vegetable presented thereto, and means for holding said apertured guard member in active position in front of said opening to prevent accidental displacement of said guard member.

6. In a vegetable trimming apparatus, a housing having a wall including means defining a feed opening and providing guard means thereabout, a shaft journaled in said housing at a location adjacent to said feed opening, drive means for said shaft, a knife providing an elongated cutting edge, means for mounting said knife on said shaft in a position to dispose said cutting edge generally parallel to the plane of said feed opening with said cutting edge extending generally radially outwardly of the axis of said shaft to thereby traverse a circular cutting path upon rotation of said knife passing said feed opening, an apertured recessed guard member pivotally mounted on said housing to pivot about a horizontal axis generally parallel to the rotation axis of said shaft for selective positioning in front of said feed opening to guide a vegetable into engagement with the knife and to guard against injury to the hands of the operator, and means for securing said guard member in position in front of said feed opening.

References Cited in the file of this patent

UNITED STATES PATENTS

| | | |
|---|---|---|
| 2,512,921 | Daugherty | June 27, 1950 |
| 2,619,140 | Hines | Nov. 25, 1952 |
| 2,624,317 | Tall | Jan. 6, 1953 |